(12) United States Patent
Herrmann

(10) Patent No.: US 12,737,568 B2
(45) Date of Patent: Sep. 15, 2026

(54) VARIABLE EDGE DOCUMENT ENCODING FOR SECURE DOCUMENT STORAGE AND RETRIEVAL

(71) Applicant: Xerox Corporation, Norwalk, CT (US)

(72) Inventor: Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/767,752

(22) Filed: Jul. 9, 2024

(65) Prior Publication Data

US 2026/0017472 A1 Jan. 15, 2026

(51) Int. Cl.
*G06K 1/12* (2006.01)
*H04N 1/00* (2006.01)

(52) U.S. Cl.
CPC ......... *G06K 1/121* (2013.01); *H04N 1/00631* (2013.01); *H04N 1/00639* (2013.01)

(58) Field of Classification Search
CPC ....... G06K 19/06037; G06K 19/06046; G06K 19/18; G06K 1/121; H04N 1/00005; H04N 2201/3271; H04N 1/00631; H04N 1/00639
USPC .......................................................... 235/494
See application file for complete search history.

(56) References Cited

U.S. PATENT DOCUMENTS 1,696,999 A * 1/1929 Cannon .................. B65H 33/00 101/216
3,982,453 A * 9/1976 D'Amato ................ B41F 13/64 83/79
5,085,417 A * 2/1992 Copham ................ B42D 15/00 270/58.08
5,107,656 A * 4/1992 Katz ........................ B43M 3/04 53/284.3
5,243,394 A * 9/1993 Matsuno .......... G06K 19/06009 347/2
7,885,597 B2 * 2/2011 Gast ................... H04N 1/00625 399/389
8,302,851 B2 * 11/2012 Horn ...................... G06Q 10/00 235/383

(Continued)

FOREIGN PATENT DOCUMENTS

WO 2022184944 * 9/2022 ............. G07C 13/00

OTHER PUBLICATIONS

Xerox Corporation, "Fraud-Resistant Effects That Protect Your Most Sensitive Documents," Xerox Specialty Imaging, 8 pages (2019).

*Primary Examiner* — Daniel St Cyr
(74) *Attorney, Agent, or Firm* — Fox Rothschild LLP

(57) ABSTRACT

This document discloses a method and system for assessing integrity of a stack of ballots or other documents. A processor receives a first set of electronic source document files, each of which includes content of a corresponding source document. The processor generates a verification image, segments the verification image into slices, and causes a print device to print verification document sheets. Each verification document sheet includes data from one of the source electronic document files and, on an edge of the sheet, a unique one of the slices of the verification image. The verification document sheets are stacked so that the slices appear on a side of the stack and, when all of the verification document sheets have been placed onto the stack, the slices collectively form the verification image.

20 Claims, 9 Drawing Sheets

(56) References Cited

U.S. PATENT DOCUMENTS

| | | | | |
|---|---|---|---|---|
| 8,806,787 | B2 * | 8/2014 | Engelby | G09F 3/0288 101/24 |
| 8,807,442 | B2 | 8/2014 | Fan et al. | |
| 8,830,533 | B2 | 9/2014 | Fan et al. | |
| 9,376,286 | B1 * | 6/2016 | Browning | B65G 57/04 |
| 9,589,217 | B2 | 3/2017 | Eschbach et al. | |
| 9,864,940 | B2 | 1/2018 | Flores et al. | |
| 9,961,230 | B2 | 5/2018 | Eschbach et al. | |
| 11,401,065 | B2 * | 8/2022 | Case | B65B 5/068 |
| 2005/0000842 | A1 * | 1/2005 | Timmerman | B26D 5/32 53/399 |
| 2014/0367956 | A1 * | 12/2014 | Wilkinson | G06Q 30/02 412/8 |

* cited by examiner

FIG. 3A
301
305
BALLOT STYLE - B1
GENERAL AND CONSTITUTIONAL AMENDMENT ELECTION
JEFFERSON COUNTY, ALABAMA
NOVEMBER 3, 2020
INSTRUCTIONS TO THE VOTER
TO VOTE YOU MUST BLACKEN THE OVAL COMPLETELY!
IF YOU SPOIL YOUR BALLOT, DO NOT ERASE, BUT ASK FOR A NEW BALLOT.
ALABAMA DEMOCRATIC PARTY
ALABAMA REPUBLICAN PARTY

VARIABLE EDGE DOCUMENT ENCODING FOR SECURE DOCUMENT STORAGE AND RETRIEVAL

BACKGROUND

In recent years, the need to ensure the security and integrity of certain documents such as voter ballots and test papers has become extremely important.

In the case of voter ballots, printed ballots are typically saved and preserved for potential future recounts. Similarly, educational institutions, licensing agencies and other entities that administer tests may save answer sheets for future verification. In either case, it is important that the integrity of the saved documents be preserved in a verifiable manner.

For example, in the case of ballots, there are times when the ballots saved in a container may be called into question. When viewing a stack of ballots, it may not be immediately apparent whether the stack is original and complete. While individual ballots within a stack may be encrypted, watermarked, or otherwise secured, no option is available to verify the authenticity of a stack of documents as a whole.

This document describes items, methods and systems that are designed to address the issues described above.

SUMMARY

In various embodiments, a method includes by a processor: receiving a first set of electronic source document files, each of which includes content of a corresponding source document; generating a verification image; and segmenting the verification image into a plurality of slices. The method also includes causing a print engine of a print device to print a plurality of verification document sheets by printing, on each verification document sheet, data from one of the source electronic document files, and on an edge of the verification document sheet, a unique one of the slices of the verification image. The method also includes, after printing each verification document sheet, placing that verification document sheet onto a stack so that the slices appear on a side of the stack and, when all of the verification document sheets have been placed onto the stack, the slices collectively form the verification image.

Various embodiments also include a print system comprising a print engine of a print device, along with a computing device comprising a processor and a memory. Other embodiments include a computer program product comprising a memory. In each case, the memory contains programming instructions that are configured to cause the processor to, in response to receiving a first set of electronic source document files, each of which includes content of a corresponding source document, implement a method as described in the previous paragraph.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" signifies values that are within +/−10 percent of a stated value.

When used in this document, terms such as "top" and "bottom," "upper" and "lower", or "front" and "rear," are not intended to have absolute orientations but are instead intended to describe relative positions of various components with respect to each other. For example, a first component may be a "front" or "top" component and a second component may be a "rear" or "bottom" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1:
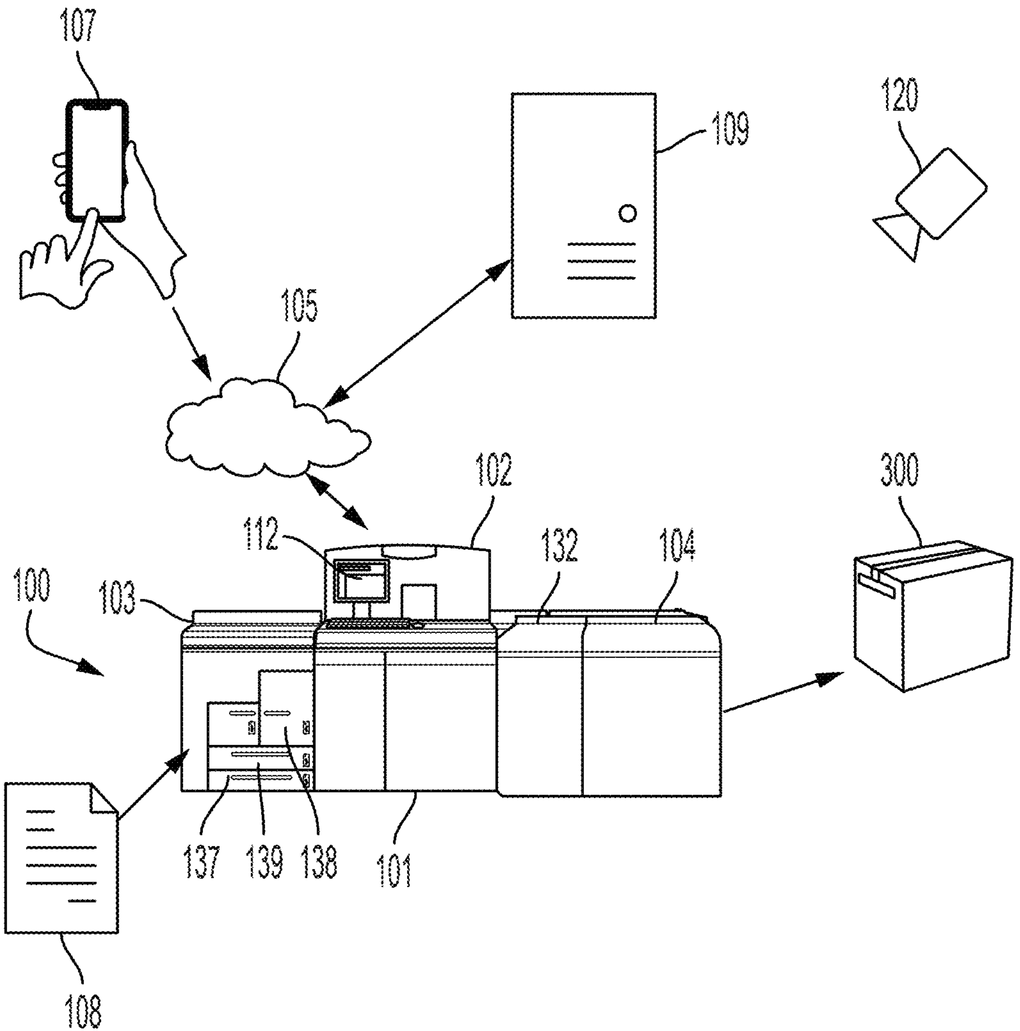
FIG. 1 illustrates elements of an example system that may be used to receive and/or generate documents and deliver the documents to a secure document collection and storage container.

FIG. 1 illustrates an example system that may be used to generate and direct documents such as ballots or test papers to a document collection and storage container. The system includes a print device 101, which in this case may include printing and scanning modules and thus may be considered to be part of a multi-function device (MFD) 100.

The MFD 100 also includes or is operatively connected to a sheet supply module 103 that includes a container that holds a supply of substrates onto which content can be printed. For example, sheet supply module 103 may include a substrate supply tray 137 such as a feeder drawer or roller with paper or other substrate that can deliver documents to a print engine of the print device 101. Any number of additional substrate supply trays may be available to supply other substrates or materials. For example, a first substrate supply tray 137 may hold a supply of paper onto which validation documents are printed, a second substrate supply tray 138 may hold a supply of adhesive labels onto which markings for placement on the outside of a container may be printed, and a third substrate supply tray 139 may hold a supply of substrate exhibiting a color that is different from that of first substrate supply tray 137. Optionally, the various substrate supply trays 137 may hold substrates of different sizes, shapes, colors, and/or materials, or multiple supply trays may hold the same type of substrate. Substrate supply module 103 also may include a transport mechanism such as a document feeder, conveyor or rollers that can receive external documents (such as document 108) and direct the documents to a scanner of the MFD to be scanned.

The MFD 100 also includes a finishing module 104, which in this example includes a transport mechanism and a housing that is configured to hold a container 300 at a position where an opening of the container 300 is adjacent to or receives the distal end of the transport mechanism. When container 300 is placed in this position, the transport mechanism may directly deliver documents printed by the print device 101 into the container without any human touching the documents between printing and delivery. When container 300 is filled, or when all documents that are to be delivered into a container 300 have been delivered, the container 300 may be removed from the housing, and the opening of the container may be sealed. In other embodiments, the finishing module 104 may include a tray on which the documents are stacked, and a wrapping module that wraps or otherwise binds the stack of documents, such as with a plastic wrap, tamper-evident tape, string and/or wire, and/or other binding material.

Optionally, the print device 101 and/or finishing module 104 also may include an additional processing module 132 that includes a scanner with a camera that is configured to capture images of received documents. In some embodiments, the scanner may be positioned in a document handling path of the MFD 100 so that the scanner can capture images of documents after the print engine of the print device 101 prints the documents. If the system includes this, the system will save copies of each scanned image to a data store. In some embodiments, the additional processing module 132 may include a cutting device with a blade that is configured to trim or otherwise cut documents printed by the print engine.

MFD 100 also includes a computing device 102 which may include a processor, memory with programming instructions, memory for storage, and an optional user interface. The computing device 102 may be communicatively connected via a communication network 105 with external electronic devices such as a user electronic device 107 and/or external server 109. The communication network 105 may include one more wired communication networks, one or more wireless communication networks, or a combination of wired and wireless communication networks. The communication network may include a wireless network if the print device is not at the site where the document files are created.

Alternatively, to provide extra security the MFD 100 may be physically located at the facility where the document files are created, such as at a polling place, and communicatively isolated from external communication networks such as the Internet. In such situations, the only communication connection between the MFD and external devices may be a direct wired or wireless connection to the machines that are used to receive ballots cast by voters. Such machines may be voter kiosks into which voters cast their votes, or they may be vote scanning machines that read physical ballot documents onto which voters printed their votes. The direct connection may be one or more physical communication wires, and/or a direct JSON or socket connection, using encryption algorithms such as those approved by National Institute of Standards and Technology (NIST) with at least 112-bit encryption and/or methods having Federal Information Processing Standards (FIPS) 140 certification.

In some embodiments, the MFD may be housed on a vehicle and transported to polling places where the MFD's operations are needed. If the MFD is housed in a vehicle, it may include features and functions such as those described in U.S. Pat. No. 11,599,312, the disclosure of which is fully incorporated into this document by reference. Alternatively, if the MFD 100 is connected to an external communication network, a firewall and/or other security measures will be implemented in the communication path between the MFD 100 and the external network.

The computing device 102 may receive one or more source document files, optionally in the form of a print job, from the user electronic device 107 and use the files to print verification document sheets containing content from the source files, such as one or more voters' entries on a ballot, or one or more test takers' answers to a test. The user electronic device 107 may be an individual's personal computing device, or it may be a kiosk that is programmed for a specific function, such as a voting machine. The computing device 102 may send electronic records that the computing device 102 generates to the external server 109 for storage.

Optionally, the system may include a camera 120 such as a video camera that is positioned to have a field of view that includes the print engine 101, additional processing module 132 and finishing module 104 so that the camera can record a video of the process and save the video to a digital video file.

Figure 2:
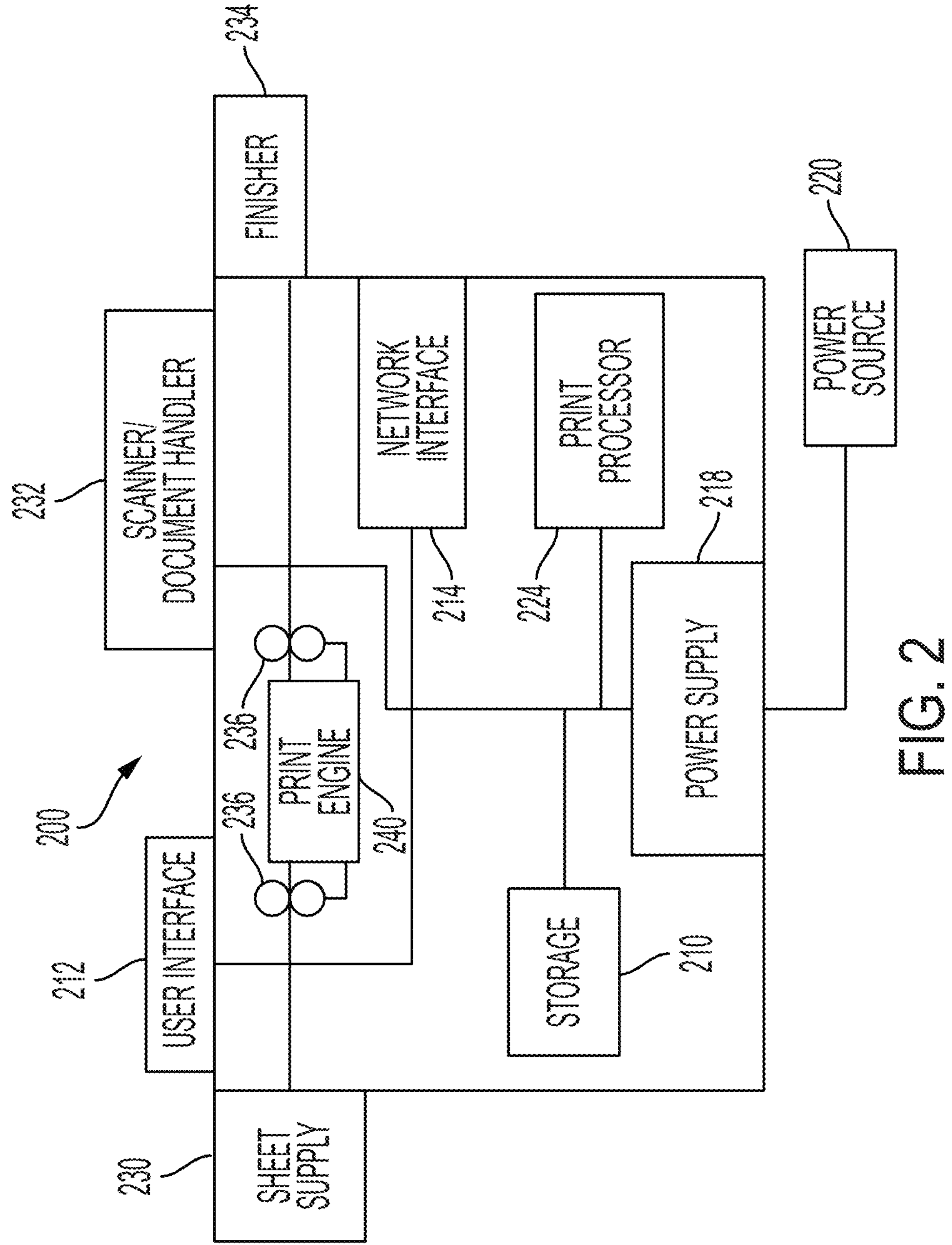
FIG. 2 illustrates components of an example multi-function device that may be used with the system.

FIG. 2 illustrates components of an example MFD 200, which may serve as the MFD 100 of FIG. 1. MFD 200 may also be embodied as, or incorporated in, a printer, copier, multi-function machine, or other device that includes the capability to print, scan, and/or copy a document, including an electronic document, on a physical printable and/or readable media, such as paper. MFD 200 includes a print engine 240 capable of printing markings on sheets of print media, a processor 224 operatively coupled to the printing engine 240, a user interface 212 operatively coupled to the processor 224, and a network interface 214 operatively coupled to the processor 224 and print engine 240. Storage 210 is a data store that is also operatively coupled to network interface 214, processor 224, and print engine 240. Print engine 240 is also operatively coupled to sheet supply 230, scanner/document handler 232, media path 236, and optionally a finisher 234. Power supply 218 receives input from a power source 220 such as an external power outlet or a battery and provides power to components in MFD 200 including storage 210, network interface 214, processor 224, and print engine 240. Other elements may be included in MFD 200 but are not described here in the interest of conciseness.

In operation, processor 224 may receive an electronic document file and a request to print the document sheets on a substrate via the network interface 214. In some embodiments, processor 224 or certain elements of it may be referred to as an image processor and may operate in a different manner than a general purpose processor if it is specialized for processing image data. A printing mechanism is initiated by instructions in signals communicated from processor 224 to print engine 240. Media path 236 is positioned to supply continuous media or sheets of a print media substrate (e.g., paper or cardstock) from sheet supply 230 to the marking device(s) included in print engine 240.

After print engine 240 generates and applies various markings to sheets of substrate, the sheets may optionally pass to finisher 234 which can flip, fold, staple, sort, collate, cut, etc., the various printed sheets based on the additional information associated with printing the electronic document. Finisher 234 may be part of the finishing module 104 of FIG. 1. In the embodiments of this disclosure, finisher 234 may include a conveyor that directly conveys the printed substrates into the secure storage container. In addition or alternatively, finisher 234 may include an output tray from which a human or a mechanical operator can lift the documents and move them to the container and/or bind the documents with a binding material.

MFD 200 also may include a scanner 232 that includes a camera and a document handler with transport components (such as a conveyor or rollers) that will pass a document under the camera so that the camera may capture an image of the document. The scanner 232 may receive and capture a digital image of each document sheet printed by the print engine 240 so that the system can create an electronic record of each document sheet that the print engine 240 prints. If the system receives a physical document from an external source, scanner 232 also (or instead) may scan the document before printing a copy of the document.

Optionally, MFD 200 may include a user interface 212 that is configured to display one or more menus that may include selectable options and/or status reports for the print jobs to be printed. User interface 212 may receive instructions for displaying the menus from processor 224 and may further provide entry information to processor 224. The menus may include an option, selectable by the user, to create an electronic record associated with the printed and/or scanned document sheets. The electronic record is created by processor 224. The electronic record may include an identification for each of the verification sheets that enter a particular container. The electronic record may additionally include one or more informational elements, such as a table of contents, a container ID, a date and/or time range during which the documents were printed, or other items. The electronic record may be one or more electronic files that are stored in the storage 210 and/or transmitted to an external storage (such as a memory of external server 109 of FIG. 1) via network interface 214. Optionally, the storage 210 may be a removable storage medium such as a removable hard drive, a USB drive, or another removable storage device that can be disconnected from the MFD and moved to a secure location.

Figure 3A:
FIGS. 3A and 3B illustrate example verification sheets on which edge marks have been printed.
Figure 3B:
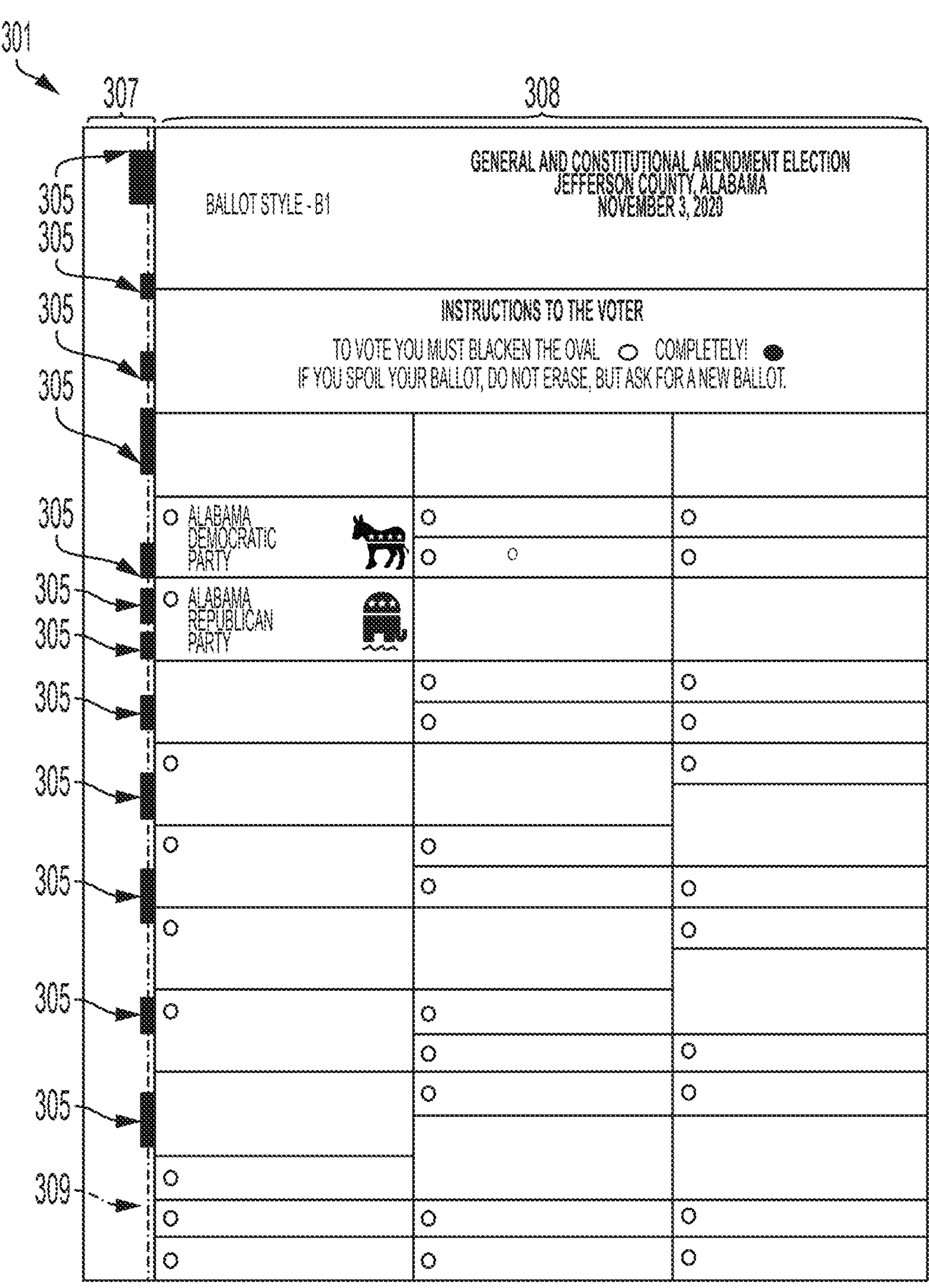

FIG. 3A illustrates an example verification document sheet 301, which in this case is that of a printed ballot with ballot content. The sheet includes one or more edge marks 305, which are marks printed on the edge of the sheet such that they are visible not only when the document is viewed from the top of the document (i.e., where the ballot content is printed), but also when the document is viewed from the side, because the ink or toner used to create the edge mark will absorb into and/or run over the edge of the document to be visible from the side. The edge marks 305 correspond to a segment of an encoded image. FIG. 3B illustrates that when first printed, the verification document sheet optionally may include a gutter 307, which is a space of the document 301 that is separate from the document content 308 and on which the edge marks 305 are printed. After the document is printed, the gutter 307 may be cut and removed from the remainder of the document, for example by being cut along a cut line 309 that is adjacent to or over the edge marks 305. After the gutter 307 is cut and removed, a small portion of the edge marks 305 remain on the document 301 and are visible when the document is viewed from the side, yielding a final verification document as illustrated in FIG. 3A. The cut line 309 may be printed on the document, or a cutting device may determine the cut line 309 to be the edge or a location proximate to the edge of the document content 308. The inclusion of gutter 307 on the document 301 may facilitate easier printing of the edge marks 305 on the document by a print device.

Figure 4:
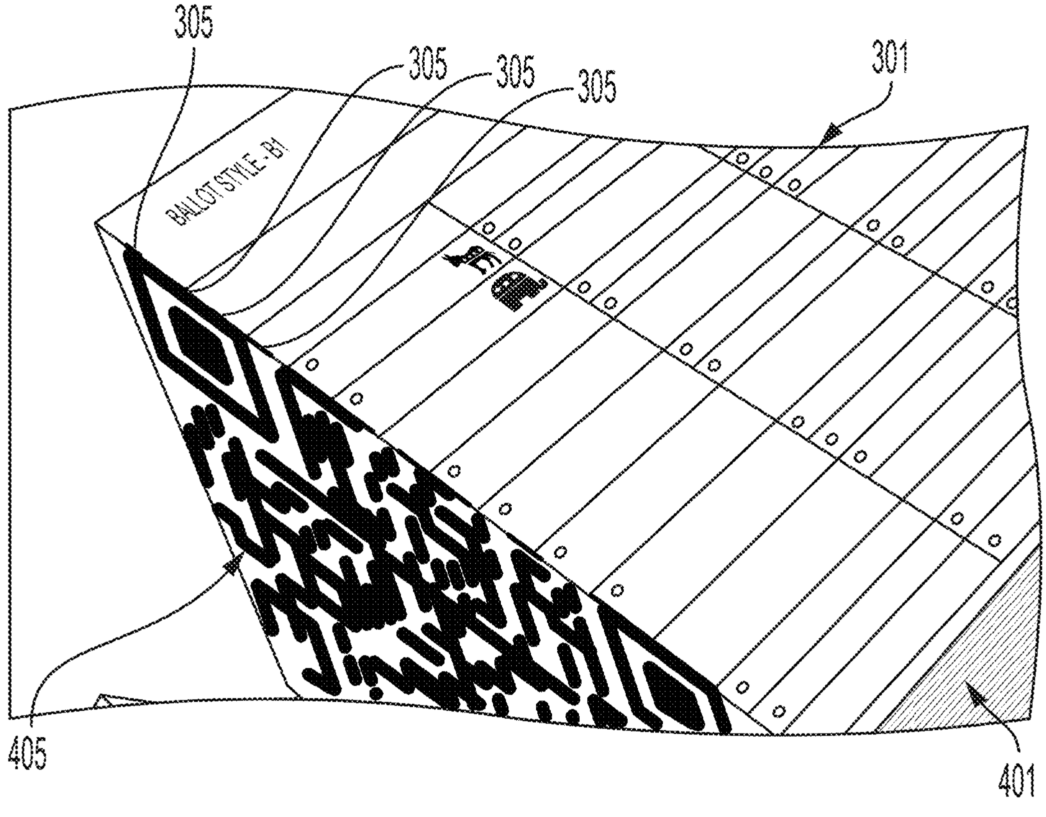
FIG. 4 illustrates a set of verification sheets that are stacked on top of each other, where the edge marks on each of the stacked sheets collectively form a verification image.

FIG. 4 illustrates that when a first verification document sheet 301 is stacked with other verification document sheets to form a stack 401 of verification documents, the edge marks 305 of the first verification document, along with the edge marks of the other documents in the stack, align and collectively form a verification image 405. The verification image 405 is an image that is saved to a data store and/or printed on a substrate, and which can later be used to identify and/or verify the integrity of the stack of documents, and/or of individual documents within a stack. For example, the verification image or data encoded in the verification image may be saved to a data store in association with files that contain content of the documents in the stack, identifiers for the documents in the stack, and/or the container in which the documents are secured. By saving and/or printing this image, a user can later refer to the data store or printed image to determine what verification image is expected to appear on the side of the stack. The user or a system may then compare the expected image to the actual image that is printed on the stack to assess whether the expected and actual images match. If the images match, it may be assumed that the stack is accurate and has not been modified. If the images do not match, it may be assumed that documents were removed from the stack, added to the stack, rearranged within the stack, or that someone otherwise tampered with the stack.

Optionally, the verification image 405 may be an encoded image such as a two-dimensional (2D) barcode as shown in FIG. 4 or another type of barcode. The barcode may include encoded data such as a uniform reference locator ("URL") or other address at which such content is stored. Other data that may be encoded in the barcode and/or stored at the address may include, for example: (i) a unique ID for the container in which the stack is stored; (ii) the date(s) and/or time(s) at which the documents in the stack were received or printed; (iii) the date(s) and/or time(s) at which the source documents that resulted in the verification document sheets were generated; (iv) a batch ID for the stack or a subset of verification document sheets in the container; (v) ballot card IDs for each document that is a ballot; and/or (vi) identifiers for the persons who are the content creators of the source documents, such as a voter ID for a ballot, or a student ID or applicant ID for a test. The encoded data also may include data extracted from and/or resulting from analysis of content of the documents. For example, in the case of ballots or tests, the encoded data could include: (i) a time range during which the ballots were cast or tests were completed; (ii) a collective metric associated with the documents such as a tally of the votes in the documents or an average or range of the test scores in the documents; and/or (iii) a quantity of documents in the stack. Other types of data may be encoded in the barcode and/or stored in the document in various embodiments.

Figure 5:
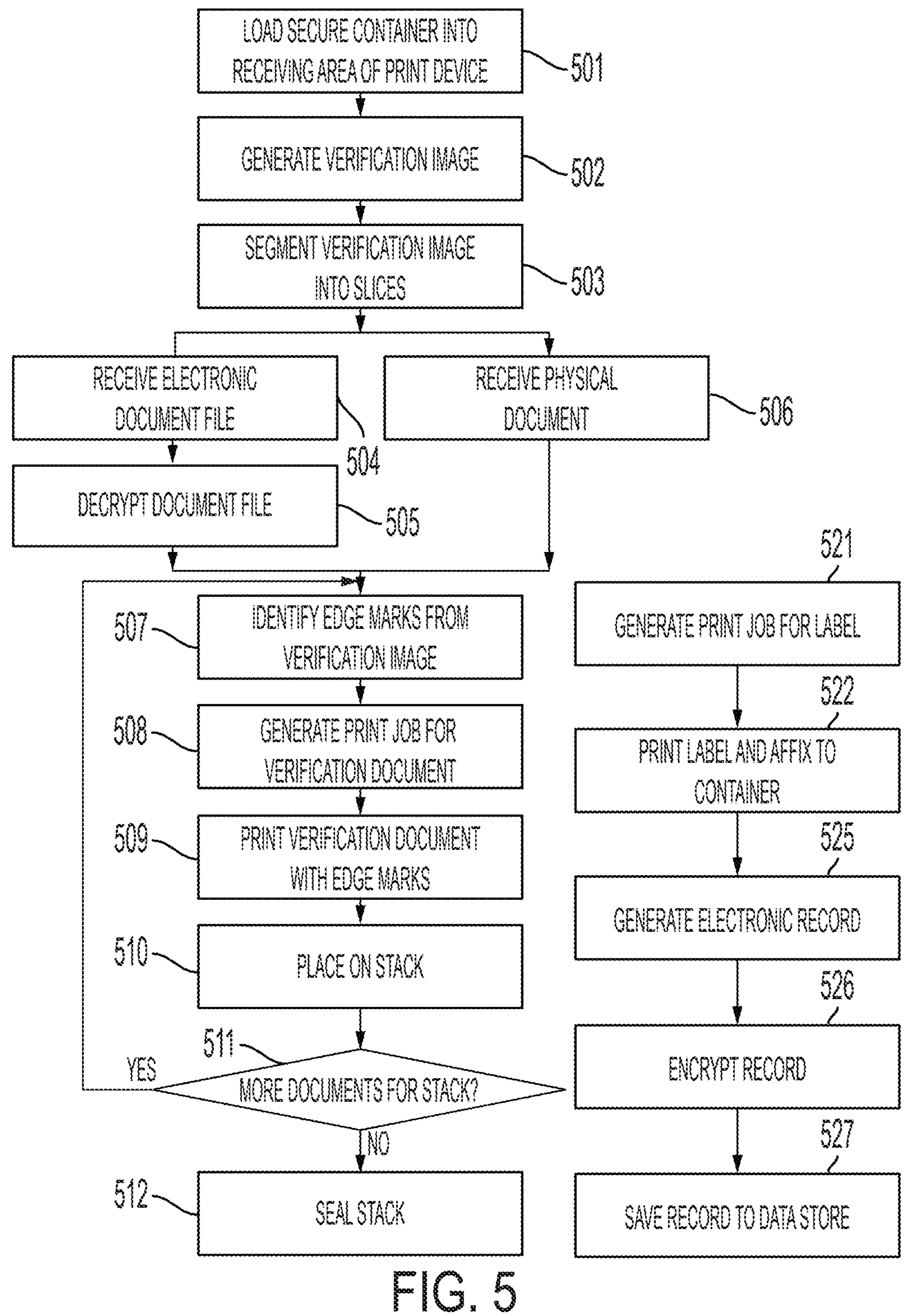
FIG. 5 is a flow diagram illustrating an example process of generating verification sheets that have edge marks, stacking the verification sheets, and securing the sheets in a container.

FIG. 5 illustrates a process for generating verification copies of ballots, test papers or other documents and securing the verification copies in a secure container using a system such as that described in FIGS. 1 and 2, where the verification copies include edge marks that form a verification image as described in FIGS. 3 and 4. In optional step

Figure 6:
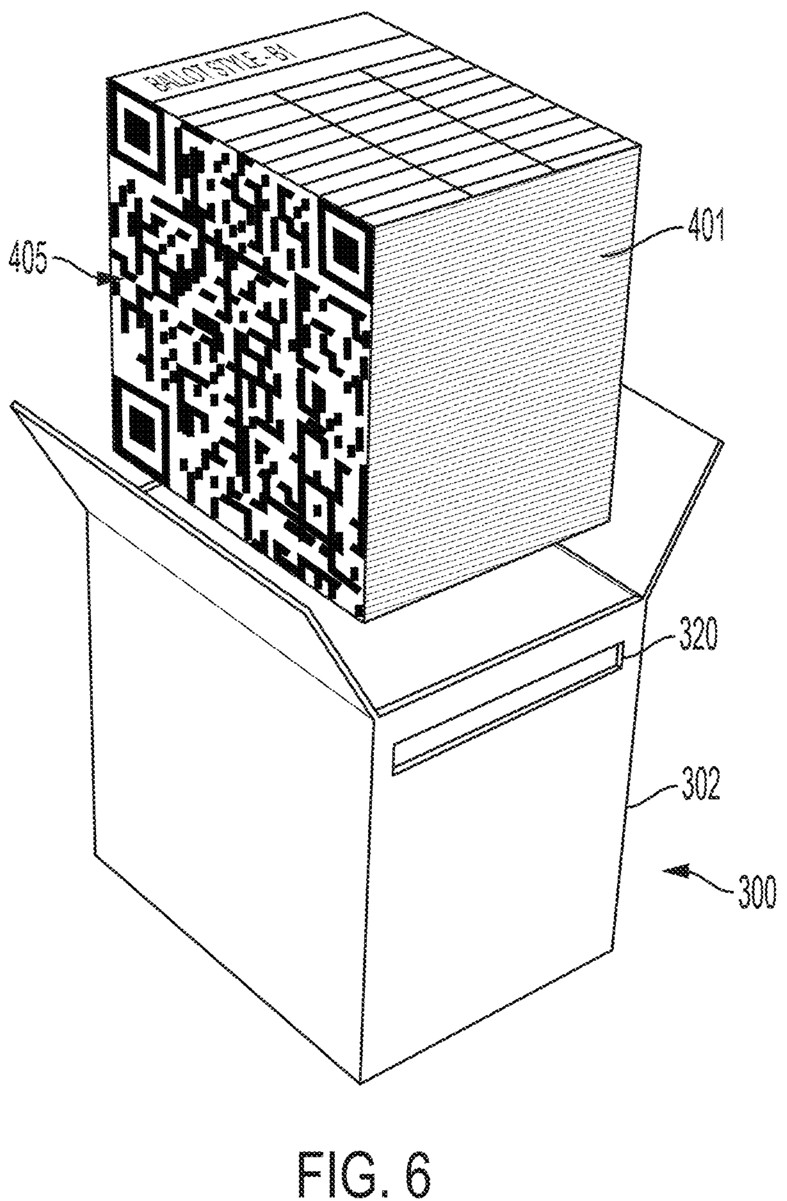
FIG. 6 illustrates an example stack of verification sheets being placed into a container.

501, a container for receiving the verification sheets may be loaded into a receiving area of a system that includes a print device. The loading will position the container to directly receive documents printed by the print device, such as inside the housing of finishing module 104 of FIG. 1. The secure container will include facets that are connected together to form a chamber. Optionally, as shown in FIG. 6, one of the facets of the container 300 may include a front facet 302 that has an opening 320 that is sized with a width that equals or exceeds a width of documents that will be received into the chamber via the opening. Alternatively, the container may simply have an opening that is formed when its top facets are opened, and the system may deliver documents into the top of the container when its top facets are opened. As yet another option, the receiving area may simply include a tray for receiving the stack of documents, and after the stack is formed the system or a human operator may bind the stack with a binding material such as plastic wrap and/or tape.

At 502 the system will generate a verification image (such as image 405 of FIG. 4), which may include encoded data, and at 503 the system will segment the image into one or more slices that optionally equals or is within a defined range of the number of documents that will be placed onto a stack in the container. The system may generate the verification image to include encoded data that associates the image with an identifier for the container 300 and/or stack, and/or to include encoded data that associates the image with the container and/or stack, and/or to include encoded data that associates the image with one or more of the verification document sheets that will be placed in the stack. Alternatively, the verification image may be completely independent of any information related to the container or the documents, and it simply may match that of a label placed on a container or on the material that binds the stack. Thus, step 502 need not necessarily occur at the point in the process shown in FIG. 5, but instead may be done at any point in the process when the system has the data that will be encoded in the verification image, if any.

The print device will print documents to be placed on the stack and secured. The printed documents will be based on source documents that are either electronic document files (at 504) or physical documents (at 506) that the system receives. Electronic document files may be received in the form of images, in portable document file (pdf) format, or another format that can secure the integrity of the content of the document. If the system receives a source document in the form of an electronic document file (step 504) such as a digital ballot or a set of test answers and the document is encrypted, then at 505 the system may decrypt the document file so that the system can extract information from it.

At 507 the processor will identify a slice from the set of slices that includes edge marks that are to appear on the printed document. Each slice will be printed in sequence, so that a first verification sheet to be placed on a stack of documents will include a first slice of the slices, the next verification sheet to be placed on top of the first sheet will include the next adjacent slice, and so on until all slices have been printed and/or all documents placed on the stack in sequence.

At 508 the processor will generate a print job, and at 509 the print device's print engine will execute the print job to print a verification document sheet on a substrate. The verification documents will include the edge marks that were identified in step 507 for that document. At 510 the system will place the document onto a stack, which may include direct placement in the storage container, or placement onto an intermediate conveyor or tray for delivery into the container when the stack is formed.

If the system has completed printing, stacking and delivering all documents onto the stack (511: NO), then at 512 the system or a human operator may seal the stack. For example, if the stack has been placed in the container, the container may be sealed with a tape such as tamper-evident tape. If no container is used, the stack may be sealed with a binding material such as a clear plastic wrap. However, if additional verification documents remain to be printed and placed on the stack (511: YES), then the system will repeat steps 507-511 until all documents have been printed, stacked and placed in the stack.

After printing each verification document, the system may directly convey the verification document sheets from the print device into the stack, without any human touching the document sheets during the transfer, to form a stack of the verification document sheets within the chamber of the container. In other embodiments, the system may convey the verification document sheets to an output tray of the system, from which a human operator or robotic device may remove the verification documents and place them into the container and/or bind the stack. At 512, the opening of the container and/or the stack will be sealed with a secure sealing material, such as tamper-evident tape, plastic wrap or other sealing materials.

Figure 7:
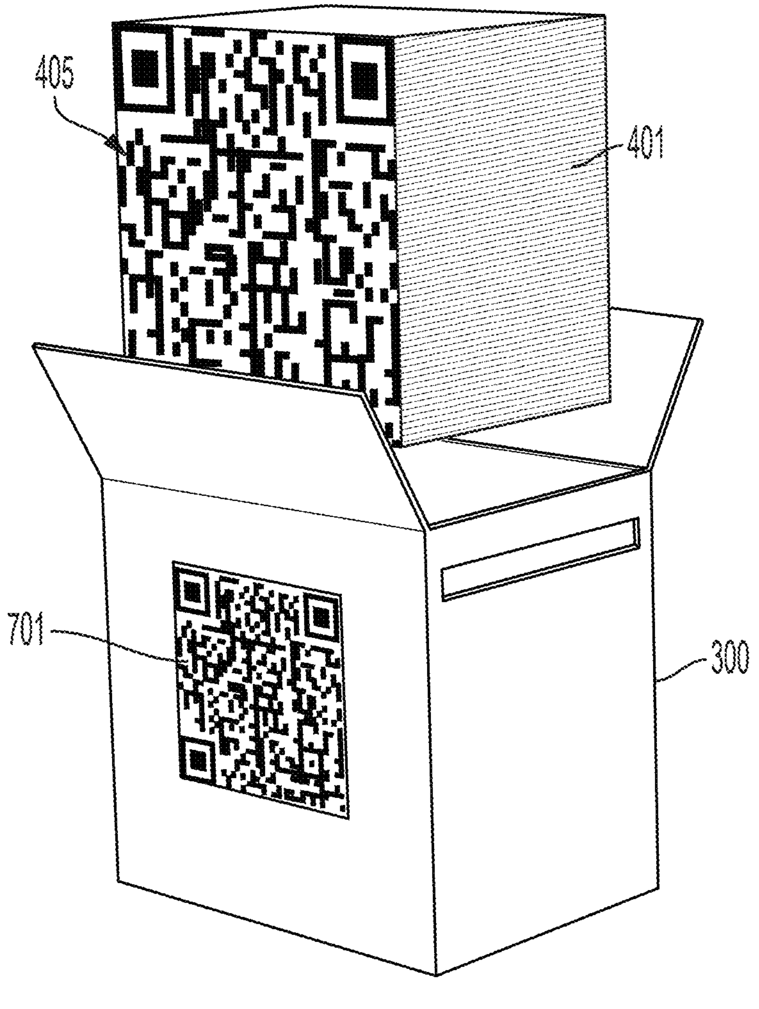
FIG. 7 illustrates an example container with an attached label that includes a printed copy of the verification image.

Optionally, at any point in the process, at 521 the system may generate a print job for a label to be placed on the container. The print job for the label may include the entire verification image. At 522 the system will print the label, such as by printing the label on an adhesive substrate stock drawn from a different substrate supply tray than is used to draw the verification sheet substrates, and the system or a human may affix the label to the container. This is shown by way of example in FIG. 7, in which an adhesive label 701 is affixed to a facet of the container 300. If no container is used, the adhesive label 701 may be affixed to the stack's binding material. The printed label 701 and the side of the stack 401 formed by edges of the verification sheets include the same verification image 405. Optionally, the label also may include other information such as a container and/or stack ID, a date, time and/or location at which the verification documents or source document files were generated, and/or other information.

The label substrate may be a lined substrate in which a backing covers the adhesive until the label will be applied to the container or binding material. Alternatively, the label substrate may be a linerless label substrate such as those that are known to those of skill in the art. Optionally, the system may add an RFID tag in the label, or the system may use a label with an embedded RFID. The RFID may be pre-coded with a unique ID that the system may record and store in association with the stack and/or container ID, or the system may encode the RFID tag with the stack ID, container ID and/or any of the other information listed above and/or below. Alternatively, the label substrate may be the container itself, and a print engine may apply the verification image directly to the container.

At 525 the processor may generate an electronic record that includes information about the documents and/or the container, and at 527 the processor will save the record to a data store. The information included in the record may include, for example: (i) a unique ID for the container; (ii) date(s) and/or time(s) at which the source document files were received or the verification document sheets were printed; (iii) date(s) and/or time(s) at which the source documents or source document files were generated; (iv) a batch ID for a subset of verification document sheets in the stack; (v) a ballot card ID for each document that is a ballot; and/or (vi) identifiers for the persons who were the content creators of the source documents, such as a voter ID for a ballot, or a student ID or applicant ID for a test. The record also may include the verification image or data that is encoded in the verification image. The system may save each container's record in separate data files, or it may bundle a group of records for multiple stacks and/or containers into a single data file, such as by generating a single data file with records for all records generated at a particular polling place during a particular time range. The data store to which the system stores the file or files may be that of the print device, that of an external server, or both. The data store may be external to the system, and if so the system may transmit the files to the external data store for storage, without keeping any copy of the files on the system that printed the documents and generated the files.

Optionally, before saving or transmitting the record to the data store at 527, the system may compress the record. Optionally, before saving or transmitting the record at 527, the system may encrypt the record at 526 so that the saved record is encrypted using at least a threshold level or type of encryption such as symmetric encryption, asymmetric encryption, encryption following the Advanced Encryption Standard (AES), Triple Data Encryption Standard (Triple DES or TDES), the RSA algorithm, Twofish, or other algorithms, any of all of which may use 128-bit, 192-bit, 256-bit or other bit size keys. The system may encrypt each record individually, or it may store multiple records and collectively encrypt a data set (such as a database) containing a group of the records.

Figure 8:
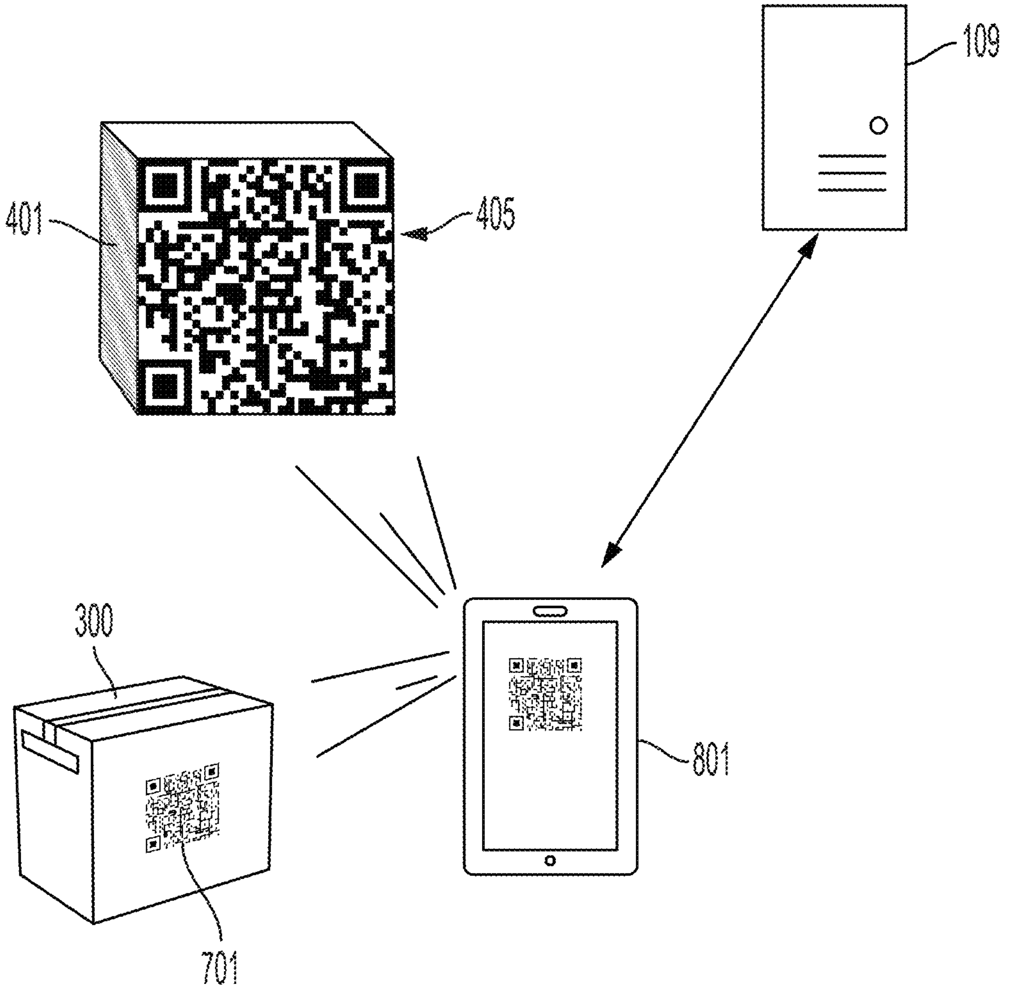
FIG. 8 illustrates a process by which a verification image is used to verify the integrity of a stack of documents.

FIG. 8 illustrates a process by which a user of an electronic device 801 may use a verification image 405 to verify the integrity of a stack 401 of documents. The device 801 will include a camera that can capture a digital image of the verification image 405. If the verification image 405 includes encoded data such as a barcode, then the electronic device 801 may include a barcode scanning application that is configured to decode the data and use the decoded data to obtain information about the documents in the box. Suitable barcode scanning applications are well known in the art. For example, the decoded data may include a URL for a data store 109 at which the electronic device 801 may obtain the information. If the barcode scanning application electronic device 801 is able to decode the data and obtain the information, then the integrity of the documents in the stack may be presumed and/or verified. If the barcode scanning application electronic device 801 is not able to decode the data in the verification image, then the integrity of the documents in the stack may not be verified but instead may be called into question.

In addition or alternatively, the electronic device also may scan the verification image as printed on the container or on a label 701 that is affixed to the container 300 or binding material. If so, then an application of the electronic may simply compare the verification image of the stack 405 to that of the label 701 or container and assess whether the images match. If the images match, then the integrity of the documents in the stack may be presumed and/or verified. If the images do not match, then the integrity of the documents in the stack may not be verified but instead may be called into question.

Although the disclosure above refers to a stack of documents and segmenting the verification images into slices that will each be printed on a particular document of the stack, in some embodiments the process described above may generate a single verification image to be applied on a single verification document. Any number of verification documents, from a single verification document to multiple verification documents, may be used in various embodiments.

The following paragraphs provide more information about certain terms used in this document.

In this document, the term "multi-function device" (or "MFD") refers to a machine comprising hardware and associated software configured to enable the device to print documents on substrates, as well as perform at least one other function such as copying, facsimile transmitting or receiving, image scanning, or performing other actions on document-based data.

The term "print device" refers to a machine having hardware capable of reading digital data and using the information from the data and associated print instructions to print a physical document on a substrate. In some embodiments, a print device may have additional capabilities such as scanning or faxing, and thus in some embodiments a print also may be a multi-function device. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate.

The term "barcode" refers to a pattern or symbol that contains encoded data. Barcodes may include, for example, one-dimensional barcodes, two-dimensional barcodes (such as matrix codes, Quick Response ("QR") codes, Aztec codes and the like), or three-dimensional barcodes.

The term "print engine" refers to the marking hardware of a print device, such as a print head, along with marking material storage and delivery components such as a print cartridge containing ink, toner or another marking material. A print engine also includes conveyors, rollers or other media transport components that are configured to move a substrate past the print head to receive printed images onto the substrate. In an inkjet printing system, the marking material storage and delivery components may include one or more printheads arranged in a print zone that eject ink drops onto the substrate. In a laser printer, the marking material storage and delivery components may include toner, a laser, and related components configured to transfer the toner onto the substrate.

The term "print job" refers to digital data embodied in a set of instructions and/or parameters that can guide operation of a print engine to print content on a substrate.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include voting machines in various applications of this disclosure. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A "computer program product" is a memory device with programming instructions stored on it.

As described above, this document discloses system, method, and computer program product embodiments for implementing a hybrid spreadsheet and coding environments. The system embodiments include a local computing device, which may have access to one or more remote computing devices. In some embodiments, one or more of the remote computing devices also may be part of the system. The computer program embodiments include programming instructions, stored in a memory device, that are configured to cause a processor to perform the methods described in this document.

Without excluding further possible embodiments, certain example embodiments are summarized in the following clauses:

Clause 1: A method, comprising, by a processor: receiving a first set of electronic source document files, each of which includes content of a corresponding source document; generating a verification image; and segmenting the verification image into a plurality of slices. The method also includes causing a print engine of a print device to print a plurality of verification document sheets by printing, on each verification document sheet, data from one of the source electronic document files, and on an edge of the verification document sheet, a unique one of the slices of the verification image. The method also includes, after printing each verification document sheet, placing each that verification document sheet onto a stack so that the slices appear on a side of the stack and, when all of the verification document sheets have been placed onto the stack, the slices collectively form the verification image.

Clause 2: The method of clause 1, further comprising saving, to a memory, the verification image in association of the verification image with information that identifies one or more of the following: the verification document sheets in the stack, a container in which the stack is stored, or the electronic source document files.

Clause 3: The method of clause 1 or 2, wherein generating the verification image comprises generating a barcode that includes encoded data.

Clause 4: The method of any preceding clause, wherein each of the source electronic document files comprises (a) a unique ballot cast by a unique voter, or (b) a set of test answers provided by a unique person who is the associated unique content creator.

Clause 5: The method of any of clauses 1-4, further comprising storing the stack in a container, printing the verification image on a label, and affixing the label to the container.

Clause 6: The method of any of clauses 1-4, further comprising binding the stack with a binding material, printing the verification image on a label, and affixing the label to the binding material.

Clause 7: The method of any preceding clause, wherein the source electronic document files are encrypted, and the method further comprises decrypting each of the source electronic document files before causing the print device to print the verification document sheet for that source electronic document file.

Clause 8: The method of any preceding clause, further comprising causing the print device to direct the documents into a container to form the stack within the container, and after the stack is formed within the container, sealing the container.

Clause 9: The method of any of clauses 1-8, further comprising, by an electronic device capturing a digital image of the side of the stack. If the electronic device successfully decodes the verification image in the digital image, the device verifies integrity of the verification document sheets in the stack; otherwise, the device declines to verify the integrity of the verification document sheets in the stack.

Clause 10: The method of any of clauses 1-8, further comprising, by an electronic device: (i) capturing a first digital image of the side of the stack; (ii) capturing a second digital image of a label on which a copy of the verification image is printed; and (ii) comparing the first digital image and the second digital image to determine whether a verification image that appears in the first digital image matches the verification image that appears in the second digital image. If the device finds a match in the first digital image and the second digital image, the device will verify integrity of the verification document sheets in the stack; otherwise the device will decline to verify the integrity of the verification document sheets in the stack.

Clause 11: A print system comprising a print engine of a print device, along with a computing device comprising a processor and a memory. The memory contains programming instructions that are configured to cause the processor to, in response to receiving a first set of electronic source document files, each of which includes content of a corresponding source document: (i) generate a verification image; (ii) segment the verification image into a plurality of slices; and (iii) cause the print engine to print a plurality of verification document sheets by printing, on each verification document sheet: (a) data from one of the source electronic document files, and (b) on an edge of the verification document sheet, a unique one of the slices of the verification image. After printing each verification document sheet, the programming instructions will cause the print device to place that verification document sheet onto a stack so that the slices appear on a side of the stack and, when all of the verification document sheets have been placed onto the stack, the slices collectively form the verification image.

Clause 12: The print system of clause 11, further comprising programming instructions that are configured to cause the processor to save the verification image to a memory in association of the verification image with information that identifies one or more of the following: the verification document sheets in the stack, a container in which the stack is stored, or the electronic source document files.

Clause 13: The print system of clause 11 or 12, wherein the programming instructions to generate the verification image comprise instructions to generate a barcode that includes encoded data.

Clause 14: The print system of any of clauses 11-13, further comprising programming instructions that are configured to cause the processor to print the verification image on a label.

Clause 15: The print system of any of clauses 11-14, further comprising a finishing module that is configured to direct the verification documents into a container to form the stack in the container.

Clause 16: The print system of any of clauses 11-15, further comprising a finishing module that is configured to bind the stack with a binding material.

Clause 17: The print system of any of clauses 11-16, further comprising programming instructions that are configured to cause the processor to decrypt each of the source electronic document files before causing the print engine to print the verification document sheet for that source electronic document file.

Clause 18: The print system of any of clauses 11-17, further comprising an electronic device that comprises a camera, a processor, and a memory containing programming instructions that are configured to cause the processor of the electronic device to: (i) use the camera to capture a digital image of the side of the stack; and (ii) if the electronic device successfully decodes the verification image in the digital image, verify integrity of the verification document sheets in the stack, otherwise decline to verify the integrity of the verification document sheets in the stack.

Clause 19: The print system of any of clauses 11-17, further comprising an electronic device that comprises a camera, a processor, and a memory containing programming instructions that are configured to cause the processor of the electronic device to: (i) use the camera to capture a first digital image of the side of the stack; (ii) use the camera to capture a second digital image of a label on which a copy of the verification image is printed; (iii) compare the first digital image and the second digital image to determine whether a verification image that appears in the first digital image matches the verification image that appears in the second digital image; and (iv) if the electronic device finds a match in the first digital image and the second digital image, verify integrity of the verification document sheets in the stack, otherwise decline to verify the integrity of the verification document sheets in the stack.

Clause 20: A computer program product comprising a memory containing programming instructions that are configured to cause a processor to, in response to receiving a first set of electronic source document files, each of which includes content of a corresponding source document implement a method according to any of clauses 1-11.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method, comprising, by a processor: receiving one or more electronic source document files, each of which includes content of a corresponding at least one source document; generating a verification image; segmenting the verification image into a plurality of slices; causing a print engine of a print device to print a plurality of verification document sheets by printing, in sequence on each verification document sheet: data from one of the source electronic document files, and on an edge of the verification document sheet, a unique one of the slices of the verification image; and after printing each verification document sheet, placing each that verification document sheet onto a stack so that the slices appear on a side of the stack and, when all of the verification document sheets have been placed onto the stack, the slices collectively form the verification image.

2. The method of claim 1, further comprising saving, to a memory, the verification image in association of the verification image with information that identifies one or more of the following: the verification document sheets in the stack, a container in which the stack is stored, or the electronic source document files.

3. The method of claim 1, wherein generating the verification image comprises generating a barcode that includes encoded data.

4. The method of claim 1, wherein: each of the source electronic document files comprises information for one or more unique ballots, each cast by a unique voter; or each of the source electronic document files comprises one or more sets of test answers, each provided by a unique person.

5. The method of claim 1, further comprising: storing the stack in a container; printing the verification image on a label; and affixing the label to the container.

6. The method of claim 1, further comprising: binding the stack with a binding material; printing the verification image on a label; and affixing the label to the binding material.

7. The method of claim 1, wherein: the source electronic document files are encrypted; and the method further comprises decrypting each of the source electronic document files before causing the print device to print the verification document sheet for that source electronic document file.

8. The method of claim 1, further comprising: causing the print device to direct the documents into a container to form the stack within the container; and after the stack is formed within the container, sealing the container.

9. The method of claim 1, further comprising, by an electronic device: capturing a digital image of the side of the stack; and if the electronic device successfully decodes the verification image in the digital image, verifying integrity of the verification document sheets in the stack, otherwise declining to verify the integrity of the verification document sheets in the stack.

10. The method of claim 1, further comprising, by an electronic device: capturing a first digital image of the side of the stack; capturing a second digital image of a label on which a copy of the verification image is printed; comparing the first digital image and the second digital image to determine whether a verification image that appears in the first digital image matches the verification image that appears in the second digital image; and if the electronic device finds a match in the first digital image and the second digital image, verifying integrity of the verification document sheets in the stack, otherwise declining to verify the integrity of the verification document sheets in the stack.

11. A print system comprising: a print engine of a print device; and a computing device comprising a processor and a memory containing programming instructions that are configured to cause the processor to, in response to receiving a first set of one or more electronic source document files, each of which includes content of one or more corresponding source documents: generate a verification image, segment the verification image into a plurality of slices, cause the print engine to print a plurality of verification document sheets by printing, in sequence on each verification document sheet: data from one of the source electronic document files, and on an edge of the verification document sheet, a unique one of the slices of the verification image, and after printing each verification document sheet, cause the print device to place that verification document sheet onto a stack so that the slices appear on a side of the stack and, when all of the verification document sheets have been placed onto the stack, the slices collectively form the verification image.

12. The print system of claim 11, further comprising programming instructions that are configured to cause the processor to save the verification image to a memory in association of the verification image with information that identifies one or more of the following:

the verification document sheets in the stack, a container in which the stack is stored, or the electronic source document files.

13. The print system of claim 11, wherein the programming instructions to generate the verification image comprise instructions to generate a barcode that includes encoded data.

14. The print system of claim 11, further comprising programming instructions that are configured to cause the processor to print the verification image on a label.

15. The print system of claim 11, further comprising a finishing module that is configured to direct the verification documents into a container to form the stack in the container.

16. The print system of claim 11, further comprising a finishing module that is configured to bind the stack with a binding material.

17. The print system of claim 11, further comprising programming instructions that are configured to cause the processor to decrypt each of the source electronic document files before causing the print engine to print the verification document sheet for that source electronic document file.

18. The print system of claim 11 further comprising an electronic device that comprises: a camera; a processor; and a memory containing programming instructions that are configured to cause the processor of the electronic device to: use the camera to capture a digital image of the side of the stack, and if the electronic device successfully decodes the verification image in the digital image, verify integrity of the verification document sheets in the stack, otherwise decline to verify the integrity of the verification document sheets in the stack.

19. The print system of claim 11 further comprising an electronic device that comprises: a camera; a processor; and a memory containing programming instructions that are configured to cause the processor of the electronic device to: use the camera to capture a first digital image of the side of the stack, use the camera to capture a second digital image of a label on which a copy of the verification image is printed, compare the first digital image and the second digital image to determine whether a verification image that appears in the first digital image matches the verification image that appears in the second digital image, and if the electronic device finds a match in the first digital image and the second digital image, verify integrity of the verification document sheets in the stack, otherwise decline to verify the integrity of the verification document sheets in the stack.

20. A computer program product comprising: a memory containing programming instructions that are configured to cause a processor to, in response to receiving a first set of one or more electronic source document files, each of which includes content of one or more corresponding source documents: generate a verification image, segment the verification image into a plurality of slices, cause a print engine of a print device to print a plurality of verification document sheets by printing, in a sequence on each verification document sheet: data from one of the source electronic document files, and on an edge of the verification document sheet, a unique one of the slices of the verification image, and after printing each verification document sheet, cause the print device to place that verification document sheet onto a stack so that the slices appear on a side of the stack and, when all of the verification document sheets have been placed onto the stack, the slices collectively form the verification image.

* * * * *